US009989726B2

(12) United States Patent
Huang et al.

(10) Patent No.: US 9,989,726 B2
(45) Date of Patent: Jun. 5, 2018

(54) ELECTROMAGNETIC DRIVING MODULE AND CAMERA DEVICE USING THE SAME

(71) Applicant: TDK TAIWAN CORP., Yangmei Taoyuan (TW)

(72) Inventors: Shih-Ting Huang, Yangmei Taoyuan (TW); Yu-Huai Liao, Yangmei Taoyuan (TW); Yi-Liang Chan, Yangmei Taoyuan (TW); Ichitai Moto, Yangmei Taoyuan (TW)

(73) Assignee: TDK Taiwan Corp., Yangmei Taoyuan (TW)

( * ) Notice: Subject to any disclaimer, the term of this patent is extended or adjusted under 35 U.S.C. 154(b) by 0 days. days.

(21) Appl. No.: 15/295,374

(22) Filed: Oct. 17, 2016

(65) Prior Publication Data

US 2017/0146769 A1 May 25, 2017

(30) Foreign Application Priority Data

Nov. 23, 2015 (TW) .............................. 104138693 A

(51) Int. Cl.
*G02B 7/02* (2006.01)
*G02B 15/14* (2006.01)
*G02B 7/04* (2006.01)
*H01F 7/06* (2006.01)
*H01H 50/02* (2006.01)

(52) U.S. Cl.
CPC .............. *G02B 7/04* (2013.01); *H01F 7/064* (2013.01); *H01H 50/021* (2013.01); *H01F 2007/062* (2013.01); *H01F 2007/068* (2013.01); *H01H 2219/066* (2013.01)

(58) Field of Classification Search
CPC ...... G02B 7/102; G02B 25/002; G02B 7/021; G02B 7/023; G02B 7/04
USPC .................. 359/697–698, 694, 808, 811–830
See application file for complete search history.

(56) References Cited

U.S. PATENT DOCUMENTS

| | | | |
|---|---|---|---|
| 2008/0192124 A1* | 8/2008 | Nagasaki | G02B 7/02 |
| | | | 348/208.11 |
| 2014/0184891 A1* | 7/2014 | Lee | G03B 3/02 |
| | | | 348/357 |

* cited by examiner

*Primary Examiner* — Dawayne A Pinkney
(74) *Attorney, Agent, or Firm* — Muncy, Geissler, Olds & Lowe, P.C.

(57) ABSTRACT

An electromagnetic driving device is provided, which includes a movable member, a stationary member, a driving magnet, a driving coil, a conductive layer, and an external terminal. The movable member and the stationary member are arranged separate from each other along a main axis. The driving magnet is positioned on the movable member. The driving coils are arranged corresponding to the driving magnet and are disposed in the stationary member. The conductive layer is electrically connected to the driving coils and is disposed in the stationary member. The external terminal is exposed by the fixed member and electrically connected to the conductive layer. The thickness of the external terminal is different from the thickness of the conductive layer.

12 Claims, 16 Drawing Sheets

ELECTROMAGNETIC DRIVING MODULE AND CAMERA DEVICE USING THE SAME

CROSS REFERENCE TO RELATED APPLICATIONS

This Application claims priority of Taiwan Patent Application No. 104138693, filed on Nov. 23, 2015, the entirety of which is incorporated by reference herein.

BACKGROUND

Field of the Invention

The present invention relates to a driving module and a camera device using the same, and more particularly to an electromagnetic driving module which converts electrical energy into mechanical energy, and a camera device using the same.

Description of the Related Art

Generally, a camera device includes a driving module to drive an element to move a predetermined distance. For example, a camera device having an image-capturing function usually includes a driving module to generate driving power. One or more optical lens units of the camera device are driven by the driving power to move along an optical axis, so as to facilitate auto-focus and auto-zoom controls.

However, since the driving module includes a complex driving member, such as a stepper motor, ultrasonic motor, piezoelectric actuator, etc. to generate the driving power and the driving power has to be transmitted by a number of transmission elements, it is not easy to assemble, and the manufacturing cost is high. In addition, a conventional driving module is also large in size and has a high power consumption due to its complex construction.

SUMMARY

Accordingly, one objective of the present invention is to provide a driving assembly, which is configured to provide a driving force to drive an element such as a lens assembly positioned in a camera device to move.

In accordance with some embodiments of the disclosure, the driving assembly includes a movable member, a stationary member, a driving magnet, a driving coil, a conductive layer, and an external terminal. The movable member and the stationary member are arranged separate from each other along a main axis. The driving magnet is positioned on the movable member. The driving coils are arranged corresponding to the driving magnet and are disposed in the stationary member. The conductive layer is electrically connected to the driving coils and disposed in the stationary member. The external terminal is exposed by the fixed member and electrically connected to the conductive layer. The thickness of the external terminal is different from the thickness of the conductive layer.

In the above-mentioned embodiments, the thickness of the external terminal in a direction that is perpendicular to the main axis is greater than the thickness of the conductive layer in a direction that is parallel to the main axis.

In the above-mentioned embodiments, the fixed member comprises a coil substrate and a lower substrate. A bottom surface of the coil substrate and a top surface of the lower substrate are formed integrally. The coil substrate and the lower substrate may be made of the same material. The driving coil is positioned in the coil substrate and arranged at a position that is near the coil substrate. The conductive layer is positioned in the lower substrate. The external terminal is exposed by the lower substrate.

In the above-mentioned embodiments, the fixed member comprises a plurality of insulation layers, and the conductive layer is sandwiched between the insulation layers.

In the above-mentioned embodiments, the electromagnetic driving assembly further comprises a position sensor and a positioning recess is formed on the top surface of the fixed member. The position sensor is positioned in the positioning recess. In this manner, the position sensor is underneath the top surface of the fixed member, or the position sensor is positioned as high as the top surface of the fixed member.

In the above-mentioned embodiments, the electromagnetic driving assembly further comprises wire connecting the fixed member to the movable member, and a connected recess is formed on the top surface of the fixed member. One end of the wire is fixed in the connected recess.

In the above-mentioned embodiments, the projection of the driving coil in a direction that is parallel to the main axis is located outside of the conductive layer.

In the above-mentioned embodiments, the fixed member comprises an extending portion extending in a direction that is parallel to the main axis. The external terminal is exposed by a lateral surface of the extending portion away from the main axis and is covered by a lateral surface of the extending portion near the main axis.

Another objective of the disclosure is to provide a camera device including the driving assembly in any one of the above-mentioned embodiments. The camera device further includes a lens assembly positioned on the movable member of the driving assembly. The optical axis of the lens assembly is aligned with the main axis.

The electromagnetic driving module has advantages of being easy to assemble and having reduced thickness.

BRIEF DESCRIPTION OF THE DRAWINGS

For a more complete understanding of the embodiments and the advantages thereof, reference is now made to the following descriptions taken in conjunction with the accompanying drawings.

DESCRIPTION OF THE ILLUSTRATIVE EMBODIMENTS

Figure 1:
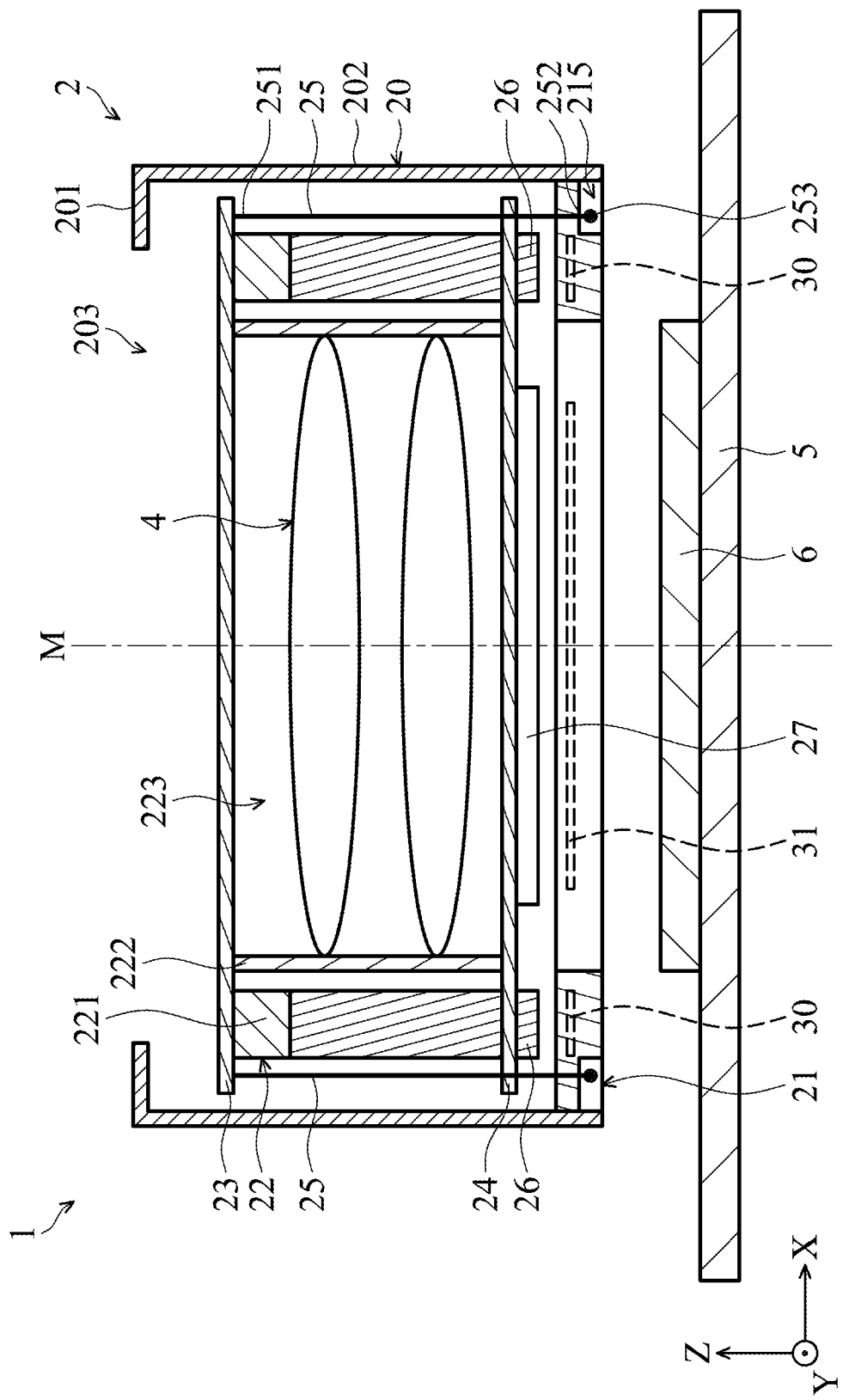
FIG. 1 shows a cross-sectional schematic view of a camera device, in accordance with some embodiments of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows a cross-sectional schematic view of a camera device 1, in accordance with some embodiments of the disclosure. In some embodiments, the camera device 1 includes an electromagnetic driving module 2, an optical lens assembly 4, a circuit board 5, and an optical sensor 6. The optical lens assembly 4 is disposed inside of the electromagnetic driving module 2. Light from the outside passes through the optical lens assembly 4 and is projected on the optical sensor 6 disposed on the circuit board 5. Once the optical sensor 6 receives the light, a digital signal corresponding to the light is produced. The electromagnetic driving module 2 is configured to control the movement of the optical lens assembly 4 in multiple directions (such as a direction that is perpendicular to the optical axis of the optical lens assembly 4). With the control of the electromagnetic driving module 2, the light passing the optical lens assembly 4 is deflected and projected on the optical sensor 6 correctly, so as to improve the image quality of the camera device 1.

In accordance with some embodiments of the disclosure, the structural features of the electromagnetic driving module 2 are described below.

In some embodiments, as shown in FIG. 1, the electromagnetic driving module 2 includes a housing 20, a fixed member 21, a movable member 22, two spring sheets 23 and 24, a number of suspension wires 25, and a number of driving magnets, such as two driving magnets 26 and two driving magnets 27 (only one driving magnet 27 is shown in FIG. 1). The elements of the electromagnetic driving module 2 can be added to or omitted, and the invention should not be limited by the embodiment.

In some embodiments, the housing 20 includes a front housing member 201 and a lateral housing member 202. An opening 203 is formed on the front housing member 201 and arranged aligned with a main axis M. The lateral housing member 202 extends from the edge of front housing member 201 and extends toward the fixed member 21.

Figure 2:
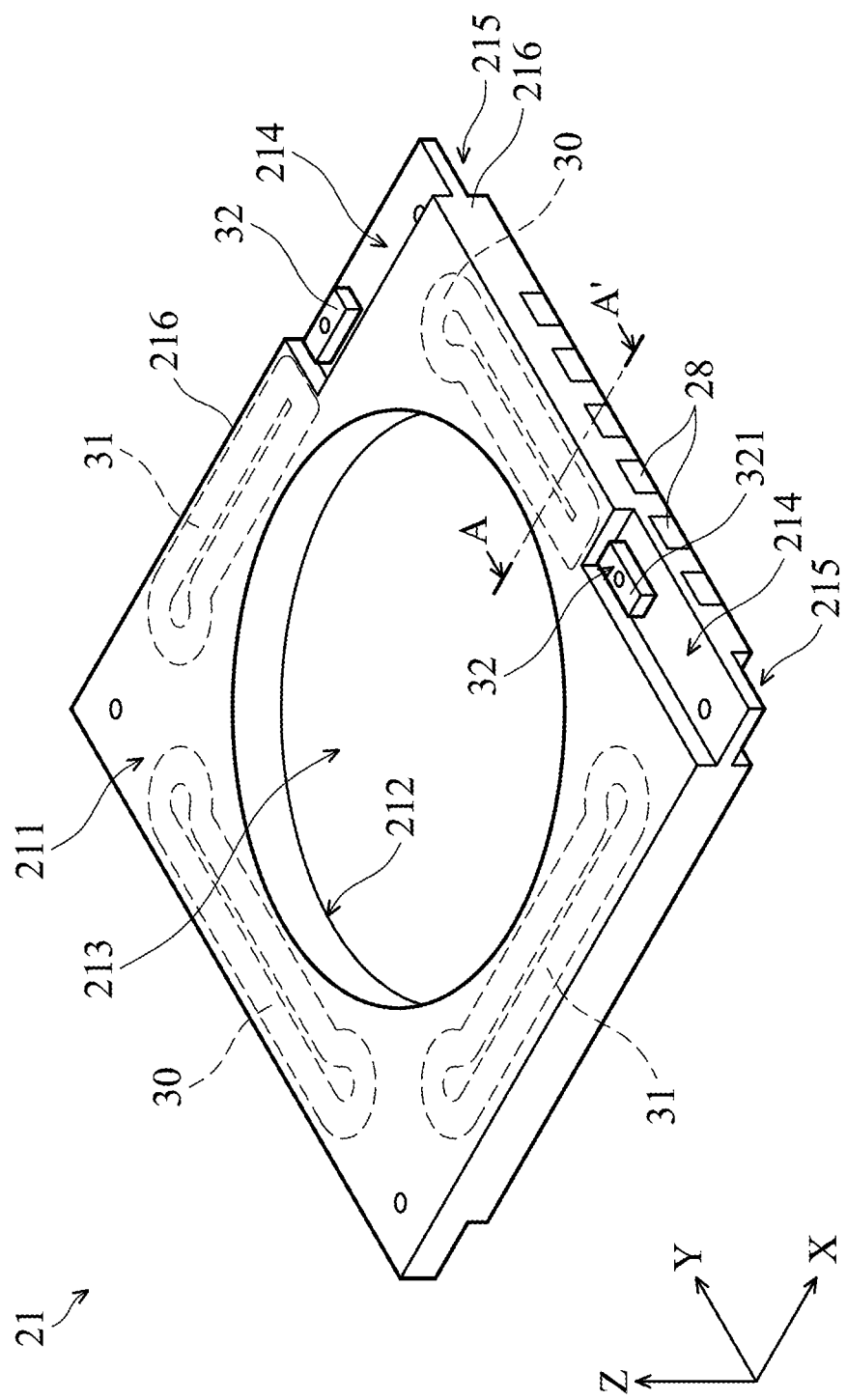
FIG. 2 shows a schematic view of partial elements of an electromagnetic driving module, in accordance with some embodiments of the disclosure.

FIG. 2 shows a schematic view of partial elements of the fixed member 21, in accordance with some embodiments of the disclosure. In some embodiments, the fixed member 21 is rectangular plate and has a top surface 211 and a bottom surface 212 opposite to the top surface 211. Four lateral surfaces 216 are connected between the top surface 211 and the bottom surface 212. An opening 213 penetrates the top surface 211 and the bottom surface 212 and is aligned with the main axis M (FIG. 1). Four connected recess 215 are formed on four corners of the top surface 211. And, two positioning recesses 214 are formed on the top surface 211 and respectively arranged adjacent to two of the connected recess 215.

Figure 3:
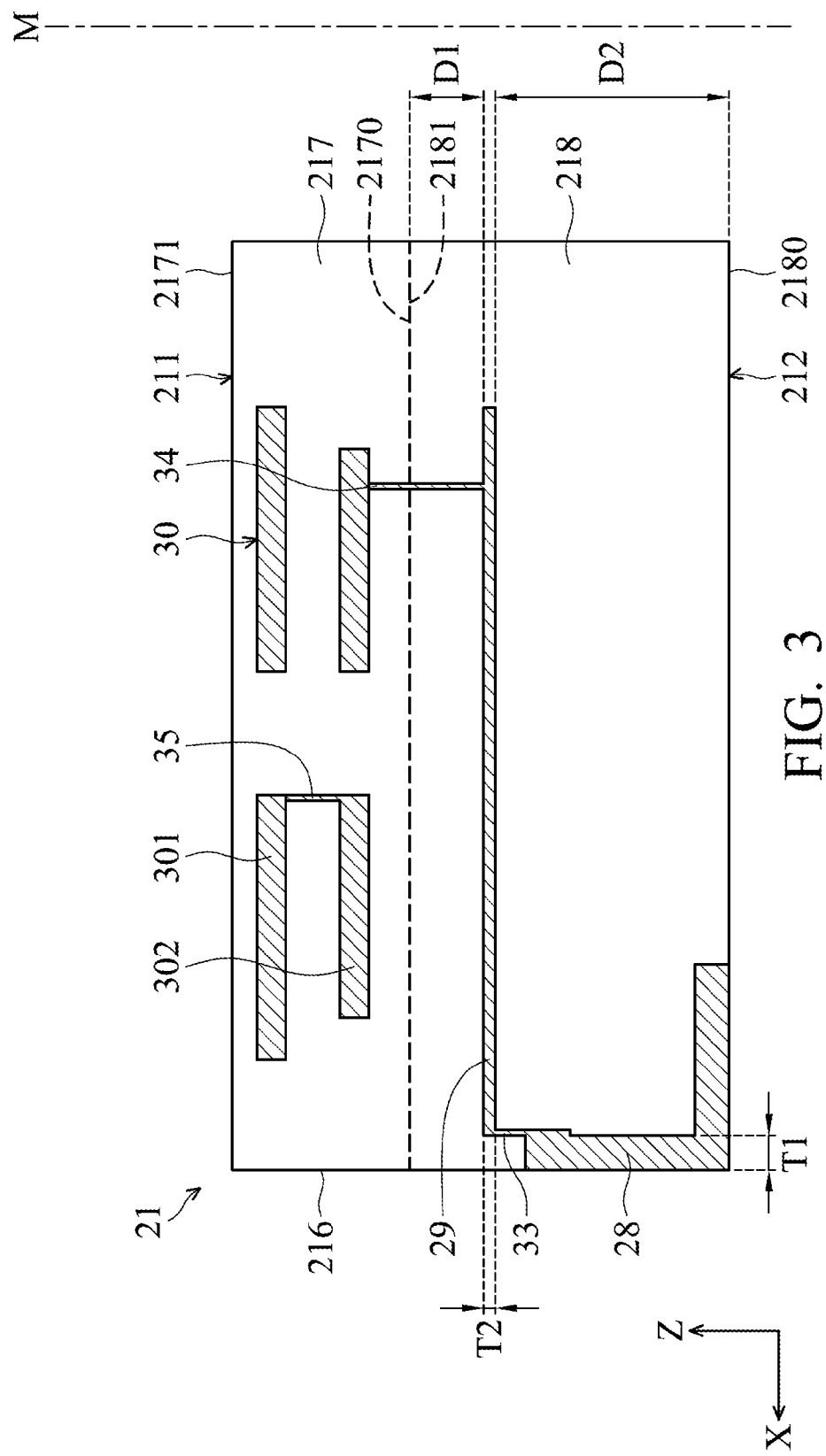
FIG. 3 shows a cross-sectional schematic view taken along line A-A' of FIG. 2.

FIG. 3 shows a cross-sectional schematic view taken along line A-A' of FIG. 2. In some embodiments, the fixed member 21 has two layered structures (i.e., coil substrate 217 and lower substrate 218). The coil substrate 217 is disposed on the lower substrate 218, such that the top surface 211 of the fixed member 21 is defined by the top surface 2171 of the coil substrate 217, and the bottom surface 212 of the fixed member 21 is defined by the bottom surface 2180 of the lower substrate 218. It should be appreciated that, in the disclosure, the fixed member 21 is divided into two layered structures for the purpose of illustration. However, it is not necessary to require the coil substrate 217 and the lower substrate 218 to be two independent elements. In some embodiments, the bottom surface 2170 of the coil substrate 217 and the top surface 2181 of the lower substrate 218 are formed integrally, and there is no gap formed therebetween. In addition, no adhesive or other bonding material is applied between the coil substrate 217 and the lower substrate 218. One method for manufacturing the fixed member 21 in accordance with some embodiments of the disclosure is discussed further with regard to the description of FIG. 7.

In some embodiments, the coil substrate 217 and the lower substrate 218 are made of the same insulating material, such as insulating material consisting of glass fiber, non-woven material, and resin, but the disclosure should not be limited thereto. The coil substrate 217 and the lower substrate 218 may be made of different material. In addition, the coil substrate 217 and the lower substrate 218 may have different thickness. For example, in a direction that is parallel to the main axis M, the thickness of the coil substrate 217 is less than that of the lower substrate 218 in the same direction.

Referring to FIGS. 2 and 3, in some embodiments, the electromagnetic driving module 2 further includes a number of external terminals 28, a conductive layer 29 (FIG. 3), a number of driving coils (such as two driving coils 30 and two driving coils 31), a number of position sensors 32, and a number of vias (such as vias 33, 34, and 35). The external terminals 28, the conductive layer 29, the driving coils 30 and 31, the position sensors 32, and the vias 33, 34, and 35 are supported by the fixed member 21.

The external terminals 28 are adapted for the connection to external control circuit. The electrical signals from the external control circuit (not shown in the figures) are transmitted to other elements of the electromagnetic driving module 2 via the external terminals 28. Additionally and alternatively, the electrical signals from other elements of the electromagnetic driving module 2 are transmitted to the external control circuit via the external terminals 28. In some embodiments, each of the external terminals 28 includes a sheet metal, and the surface of each external terminal is exposed to the outside by the lateral surfaces 216.

In some embodiments, each of the external terminals 28 is formed into an L-shaped configuration. A region of the surface of the external terminals 28 is exposed by the lateral surfaces 216, and another region of surface of the external terminals 28 is exposed by the bottom surface 212. In addition, since the external terminals 28 are inserted into the lower substrate 218, the external terminals 28 are prevented from being deformed to ensure the stability of the electrical connection to the external circuit.

The conductive layer 29 electrically connects the external terminals 28 to the other electric elements in the electromagnetic driving module 2, in some embodiments, the conductive layer 29 is positioned in the lower substrate 218 and not exposed to the outside. In addition, the conductive layer 29 is positioned near the driving coil 217. Namely, the distance D1 between the conductive layer 29 and the top surface 2181 of the lower substrate 218 is less than the distance D2 between the conductive layer 29 and the bottom surface 2180 of the lower substrate 218. In this manner, the required length of the internal trace connecting between the driving coils 30 and 31 to the conductive layer 29 is decreased, and the stability of the electrical connection is ensured.

In some embodiments, the thickness of the external terminals 28 is different from the thickness of the conductive layer 29. For example, each of the external terminals 28 has a thickness of T1 in a direction that is perpendicular to the main axis M, and the conductive layer 29 has a thickness of T2 in a direction that is parallel to the main axis. The thickness T2 of the conductive layer 29 is less than the thickness T1 of the external terminals 28 so as to satisfy reduced-thickness requirement of the electromagnetic driving module 2.

The driving coils 30 and 31 electrically connect the conductive layer 29 and are configured to generate a magnetic field to drive the movable member 22 to move relative to the fixed member 21. In some embodiments, as shown in FIG. 2, the two driving coils 30 are arranged to be adjacent to the two opposite lateral surfaces 216 in the X-axis direction, and the two driving coils 31 are arranged to be adjacent to the two opposite lateral surfaces 216 in the Y-axis direction. In some embodiments, the interrelationship of each driving coils 30 and 31 and the other elements are similar. For the purpose of brevity, only the features regarding one of the driving coils 30 are described below. However, the driving coils may be arranged in different configurations, and the invention should not be limited by the embodiment.

In some embodiments, as shown in FIG. 3, the driving coil 30 is positioned in the coil substrate 217 and is not exposed to the outside of the coil substrate 217. The driving coil 30 is connected to the conductive layer 29 by the via 34, and the projection of the driving coil 30 in a direction that is parallel to the main axis M is not overlapped with the conductive layer 29. As a result, the occurrence of parasitic capacitance is avoided, and the operation in the electromagnetic driving module 2 is conducted correctly.

In some embodiments, the driving coil 30 includes two conductive structures 301 and 302. The two conductive structures 301 and 302 are configured to generate magnetic field so as to actuate the movement of the movable member 22. In some embodiments, the two conductive structures 301 and 302 are spaced from the top surface 211 of the fixed member 21 by a different distance, wherein the conductive structure 301 is closer to the top surface 211 of the fixed member 21 than the conductive structure 302. The width (the distance between the outermost conductive structures at two opposite sides) of the two conductive structures 301 and 302 may be different so to optimize operation in the electromagnetic driving module 2. For example, in a direction that is perpendicular to the main axis M, the width of the conductive structure 301 is greater than that of the conductive structure 302.

It should be appreciated that the number of layers in the conductive structure should not be limited to the embodiment. The number of layers may be greater than three, and the number may be either an even number or an odd number.

In some embodiments, the two driving coils 30 are connected by a conductive trace (not shown in the figures) positioned in the coil substrate 217, so that the two driving coils 30 are supplied with the same electric current in the operation of the electromagnetic driving module 2. Additionally, the two driving coils 31 are connected by a conductive trace (not shown in the figures) positioned in the coil substrate 217, so that the two driving coils 30 are supplied with the same electric current in the operation of the electromagnetic driving module 2. However, the disclosure should not be limited to the embodiment. In some other embodiments, each of the two driving coils 30 is connected to the conductive layer 29 by a respective conductive trace, and each of the two driving coils 31 is electrically connected to the conductive layer 29 by a respective conductive structure. The two driving coils 30 are supplied with the same electric current from the conductive layer 29, and the two driving coils 31 are supplied with the same electric current from the conductive layer 29.

Figure 4A:
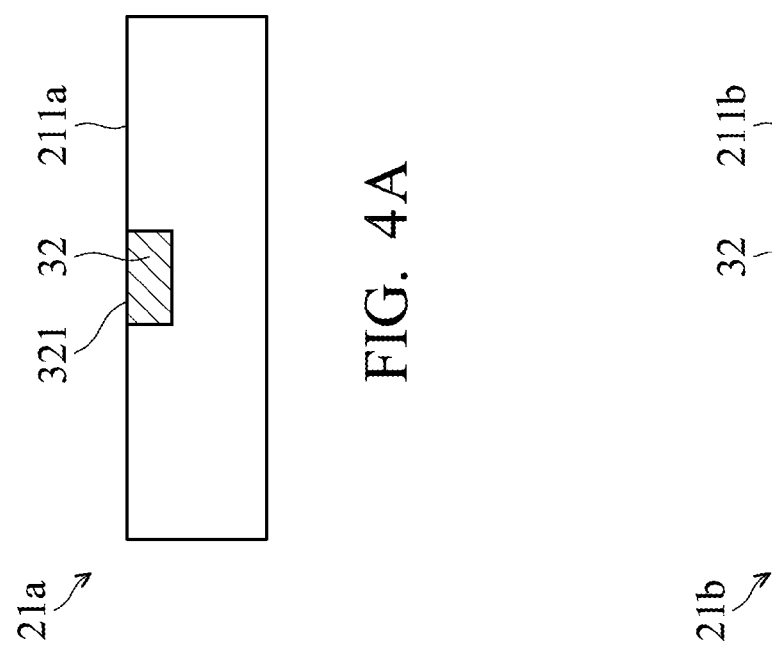
FIG. 4A shows a cross-sectional view of a position sensor and a fixed member, in accordance with some embodiments of the disclosure.
Figure 4B:
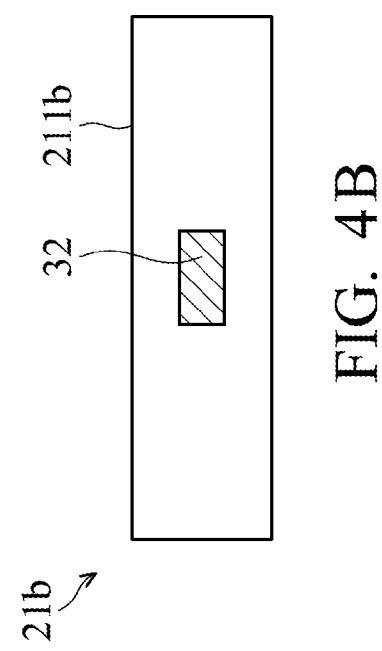
FIG. 4B shows a cross-sectional view of a position sensor and a fixed member, in accordance with some embodiments of the disclosure.

As shown in FIG. 2, the two position sensors 32 are configured to detect changes in the magnetic field of the driving magnets 26 and 27 (FIG. 1) and to produce electric signals to the control module (not shown in the figures) according to the detected result, so as to establish a closed-loop control. In some embodiments, the two position sensors 32 are positioned in the two respective positioning recesses 214 of the fixed member 21 and are electrically connected to the conductive layer 29 (FIG. 3). To satisfy the reduced-thickness requirement of the electromagnetic driving module 2, the position sensors 32 are positioned underneath the top surface 211 of the fixed member 21. Alternatively, the position sensors 32 are positioned as high as the top surface 211 of the fixed member 21. In some embodiments, the two position sensors 32 are Hall sensors. However, it should be appreciated that other variations and modifications can be made to embodiments of the disclosure. For example, as shown in FIG. 4A, the two position sensors 32 are inserted into the fixed member 21, and the top surfaces 321 of the position sensors 32 are as high as the top surface 211 of the fixed member 21. Alternatively, as shown in FIG. 4B, the two position sensors 32 are inserted into the fixed member 21, and the top surfaces 321 of the position sensors 32 are not exposed to the outside of the fixed member 21.

Referring to FIG. 1, the movable member 22 is configured to receive the optical lens assembly 4 so as to enable the optical lens assembly 4 to move in the camera device 1. In some embodiments, the movable member 22 is an auto focusing module (AF module) and includes a frame 221 and a lens barrel 222. The lens barrel 222 is surrounded by the frame 221. A channel 223 penetrates the lens barrel 222 along the main axis M and is arranged to correspond to the opening 203. The optical lens assembly 4 is positioned in the channel 223, wherein the optical axis of the optical lens assembly 4 is aligned with the main axis M. It should be appreciated that, while the movable member 22 shown in FIG. 1 is used to receive an optical lens assembly 4, the disclosure should not be limited to the embodiment. The movable member 22 can be used to receive other elements.

Two spring sheets 23 and 24 are respectively connected to the upper side and the lower side of the movable member 22. In some embodiments, the lens barrel 222 for receiving the optical lens assembly 4 is positioned between the two spring sheets 23 and 24. The two spring sheets 23 and 24 enable the lens barrel 222 to move relative to the fixed member 21 along a direction that is parallel to the main axis M.

The suspension wires 25 are configured to enable the movable member 22 to move in a direction that is perpendicular to the main axis M. In some embodiments, the electromagnetic driving module 2 includes four suspension wires 25 connected between the fixed member and the movable member 22. Specifically, one end 251 of each suspension wire 25 is connected to the spring sheet 23 positioned on the movable member 22, and the other end 252 of each suspension wire 25 is connected to the connected recess 215 of the fixed member 21 via an adhesive material 25. The adhesive material 25 may include solder or another suitable material. Since the ends 252 of the suspension wires 25 are received in the connected recesses 215, the suspension wires 25 have sufficient length that allows the movable member 22 to move within a greater range in the X-Y plane. Therefore, even though the total thickness of the electromagnetic driving module 2 is decreased, the specifications of the electromagnetic driving module 2 are maintained.

In some embodiments, the suspension wires 25 are electrically connected to the conductive layer 29 (FIG. 3) in the fixed member 21. Electrical signals from the conductive layer 29 are transmitted to the movable member 22 through the suspension wires 25 and the spring sheet 23 to facilitate control of the movable member 22. In some non-illustrated embodiments, the two spring sheets 23 and 24 are omitted. The movable member 22 includes a flange (not shown in the figures) extending outwardly; and each of the suspension wires 25 is connected between the flange of the movable member and the fixed member 21.

In some embodiments, the driving magnets 26 and 27 are positioned at the bottom surface of the movable member 22 that faces the fixed member 21 and arranged to correspond to the driving coils 30 and 31. Specifically, the two driving magnets 26 are arranged to correspond to the driving coils 30, and the two driving magnets 27 (only one driving magnet 27 is shown in FIG. 1) are arranged to correspond to the driving coils 31 (only one driving coil 31 is shown in FIG. 1). As a result, the movable member 22 is driven to move in the Y-direction by the magnetic force produced by the two driving coils 30 and the two driving magnets. In addition, the movable member 22 is driven to move in the X-direction by the magnetic force produced by the two driving coils 31 and the two driving magnets 27. In some embodiments, the driving magnets 26 and 27 are arranged to correspond to a coil (not shown in the figure) positioned on the lens barrel 222. And, the lens barrel 222 is driven to move in the Z-direction by the magnetic force produced by the coil and the driving magnets 26 and 27.

It should be noted that, in the above embodiments, since the position sensors 32 are disposed in the positioning recesses 214 and the adhesive material 253 for fixing the suspension wires 25 is applied in the connected recesses 215, the position sensors 32 and the adhesive material 253 are not projected beyond the top surface 211 of the fixed member 21. As a result, the reduced-thickness requirement of the electromagnetic driving module 2 is satisfied. On the other hand, in such arrangements, the distance between the driving coils 30 and 31 disposed in the fixed member 21 and the driving magnets 26 and 27 are decreased, so that the driving force of the electromagnetic driving module 2 is improved.

Figure 5:
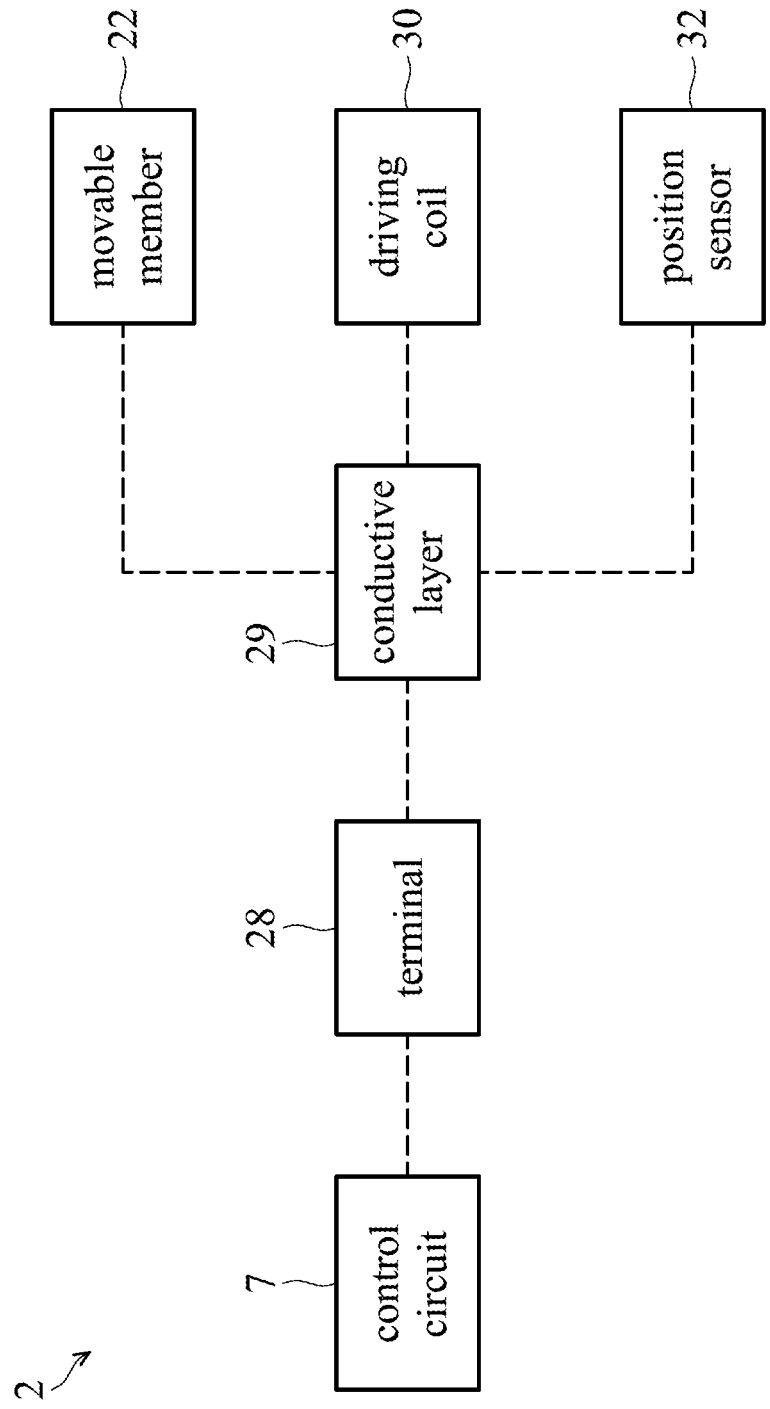
FIG. 5 shows a block diagram of an electromagnetic driving module, in accordance with some embodiments of the disclosure.

FIG. 5 shows a block diagram of partial elements of the electromagnetic driving module 2, in accordance with some embodiments of the disclosure. In some embodiments, the conductive layer 29 is electrically connected to the movable member 22, the driving coils 30, and the position sensor 32. Electrical signals from the control circuit 7 are transmitted to the movable member 22, the driving coils 30 and 31, and the position sensor 32 via the external terminals 28 and the conductive layer 29. Therefore, the electromagnetic driving module 2 can be connected to the control circuit 7 with the least waste of time, and the manufacturing cost and the manufacturing time is decreased.

The method for manufacturing the fixed member 21 according to some embodiments of the disclosure is described below.

Figure 6A:
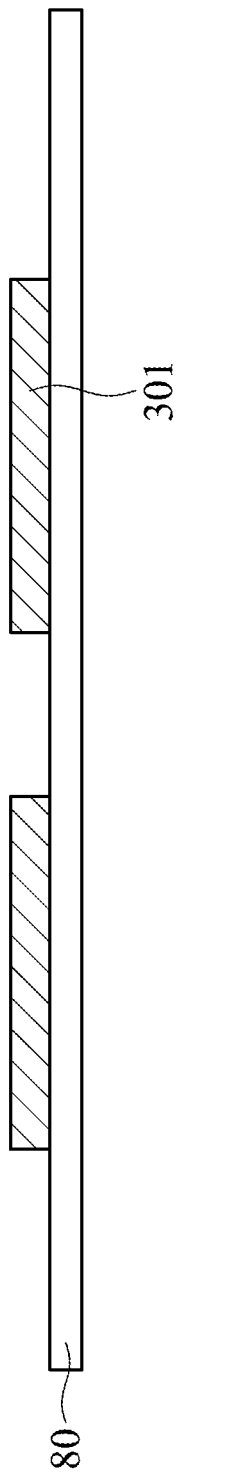
FIGS. 6A-6J show a schematic view of the stages for manufacturing partial elements of an electromagnetic driving module, in accordance with some embodiments of the disclosure.
Figure 6B:
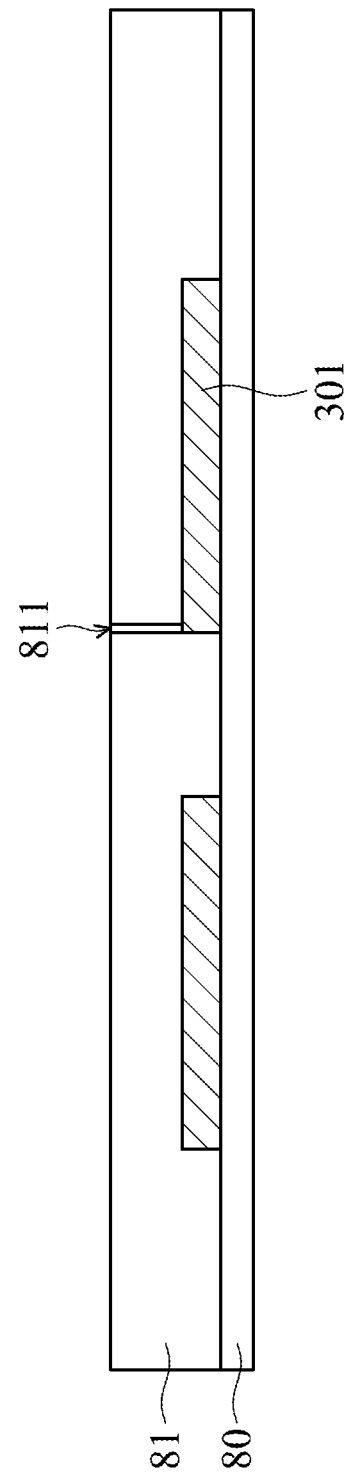
Figure 6C:
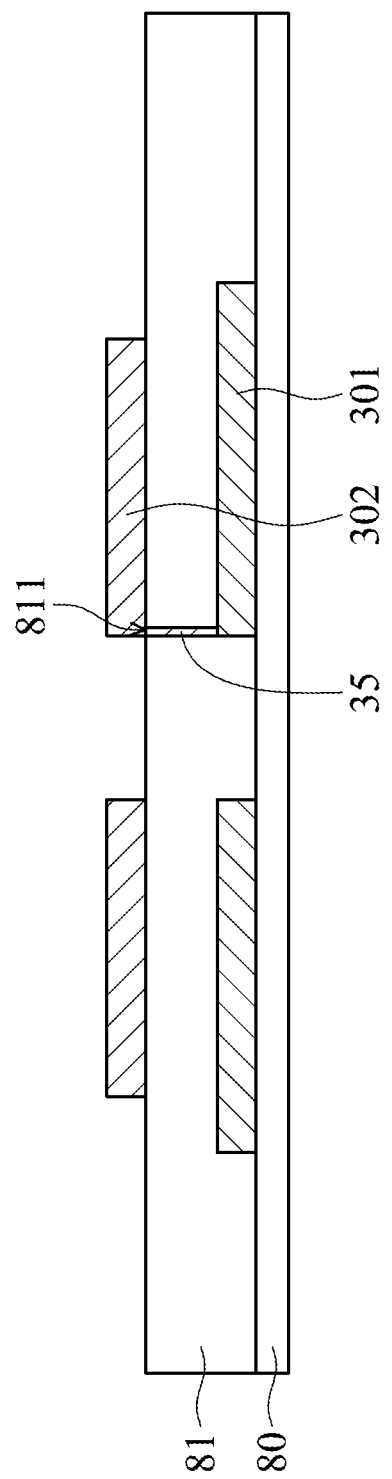
Figure 6D:
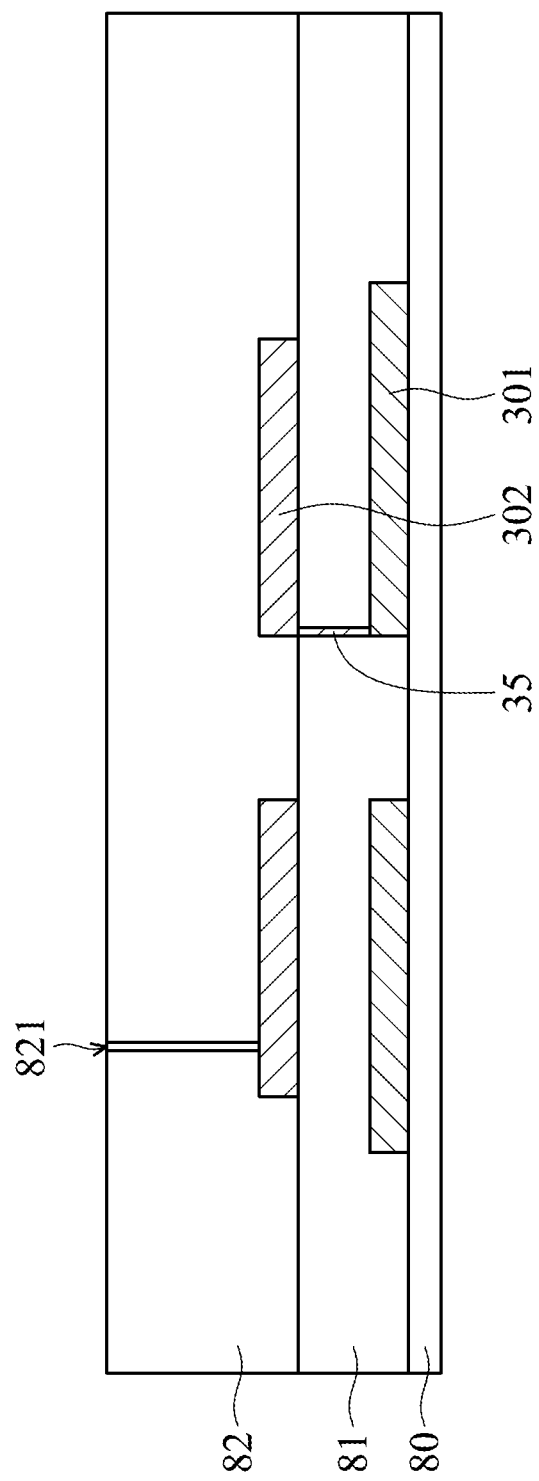

FIGS. 6A-6J show a schematic view of the stages for manufacturing the fixed member 21, in accordance with some embodiments of the disclosure. As shown in FIG. 6A, the method for manufacturing the fixed member 21 begins with forming an insulation layer 80 and forming a conductive material 301 on the insulation layer 80. In some embodiments, the conductive material 301 is formed on the insulation layer 80 by bonding or coating techniques. Afterwards, as shown in FIG. 6B, an insulation layer 81 is formed on the layer of conductive material 301 and a drilling process is performed to form a blind hole 811 on the insulation layer 81 to expose the conductive material 301. The insulation layer 81 is formed on the conductive material 301 by bonding or coating techniques. Afterwards, as shown in FIG. 6C, a via 35 is formed in the blind hole 811 and a conductive material 302 is formed on the insulation layer 81. Afterwards, as shown in FIG. 6D, an insulation layer 82 is formed on the conductive material 302 and a drilling process is performed to form a blind hole 821 on the insulation layer 82 to expose the conductive material 302.

Figure 6E:
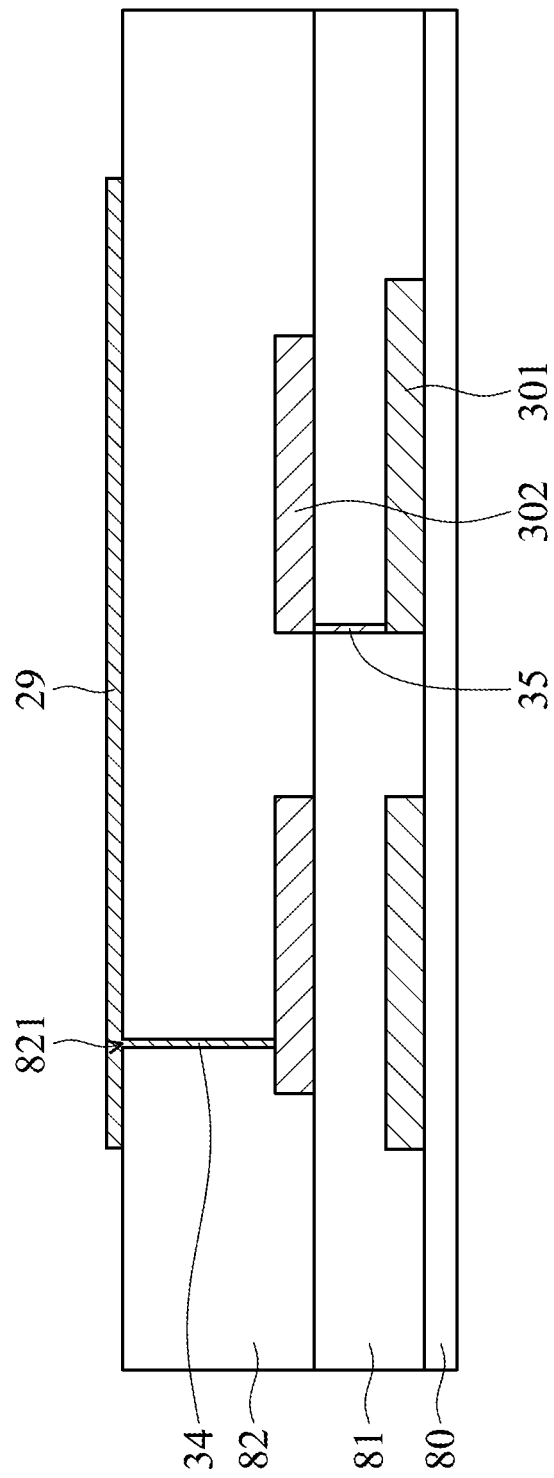
Figure 6F:
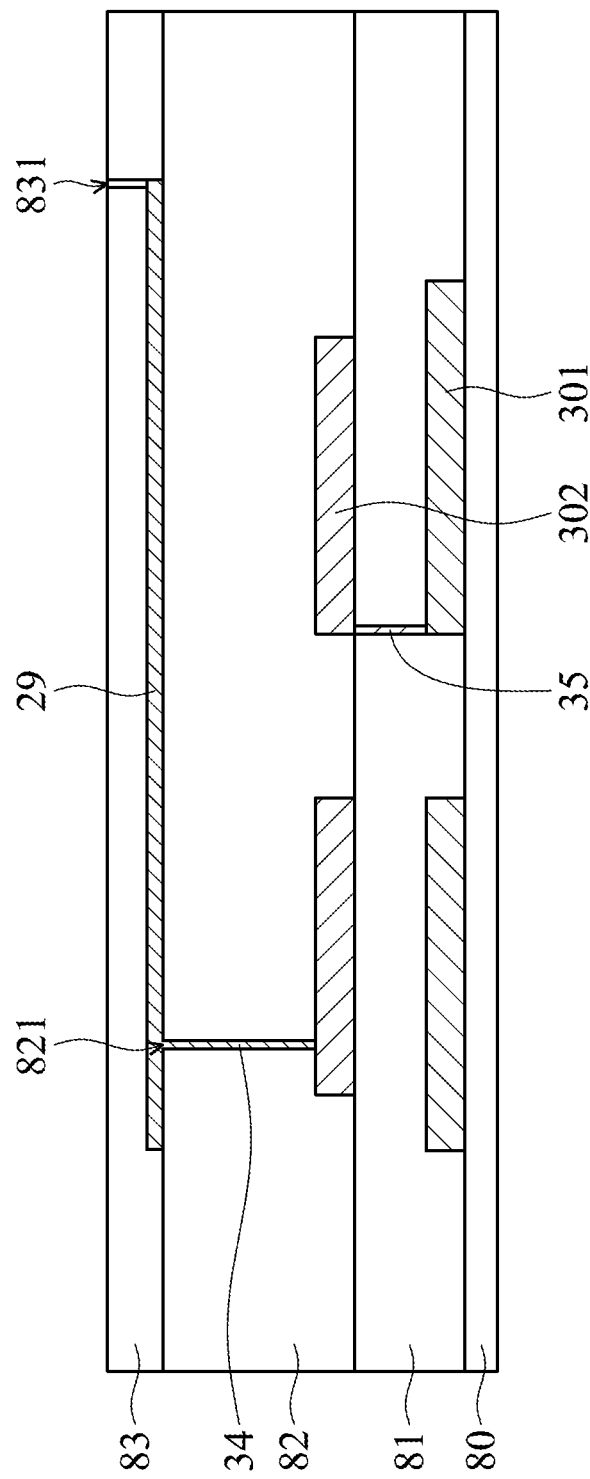
Figure 6G:
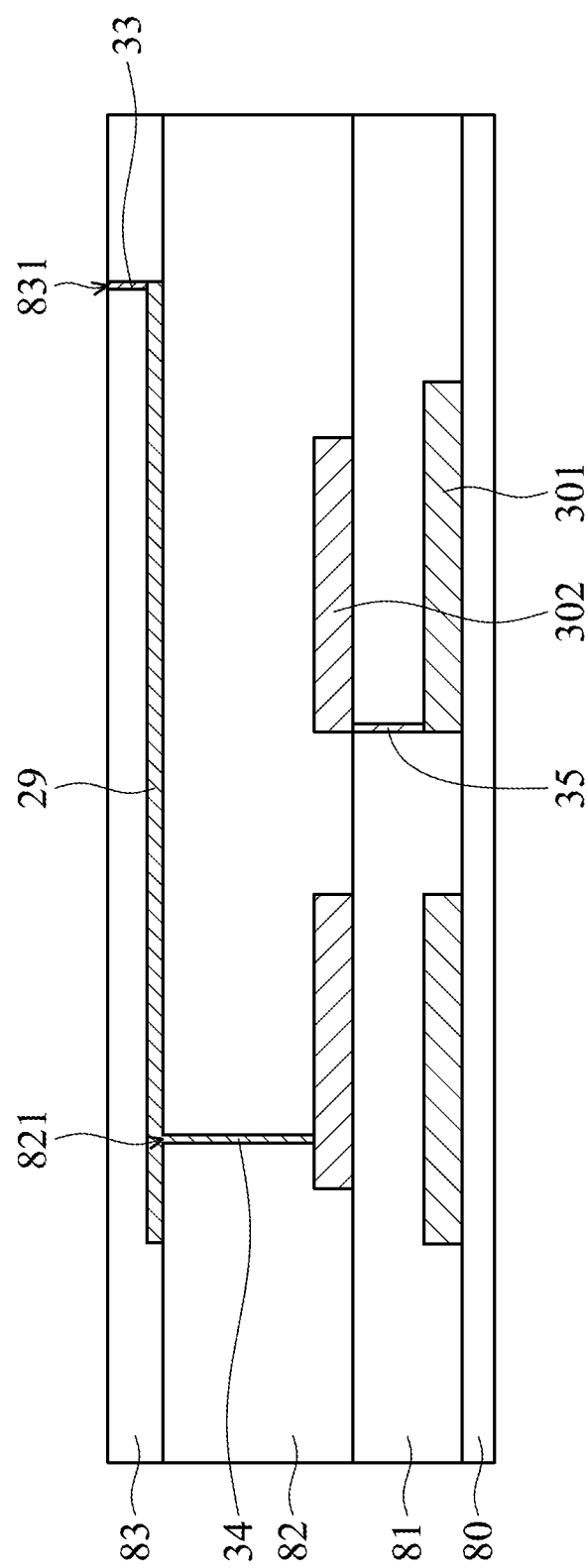
Figure 6H:
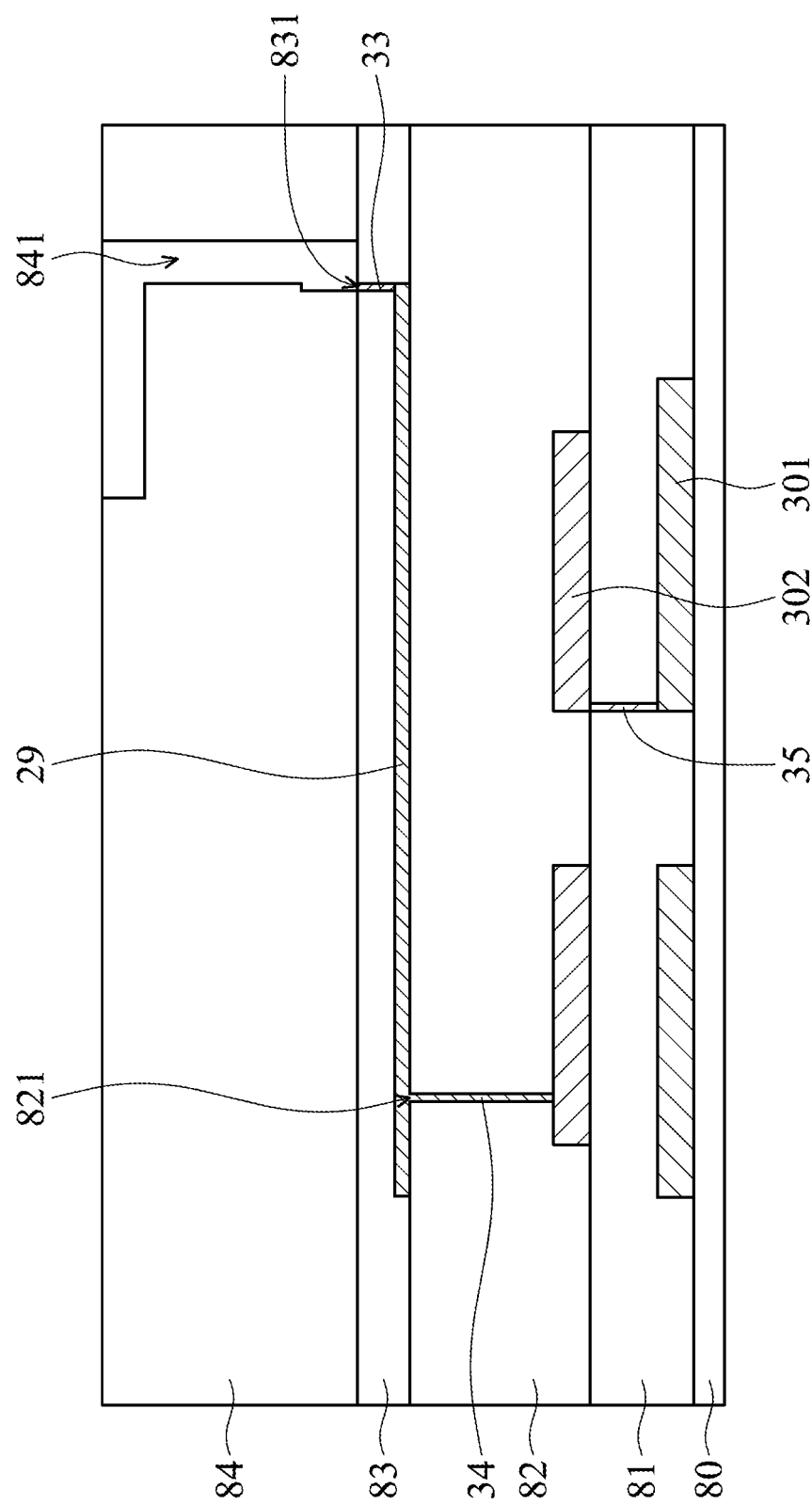
Figure 6I:
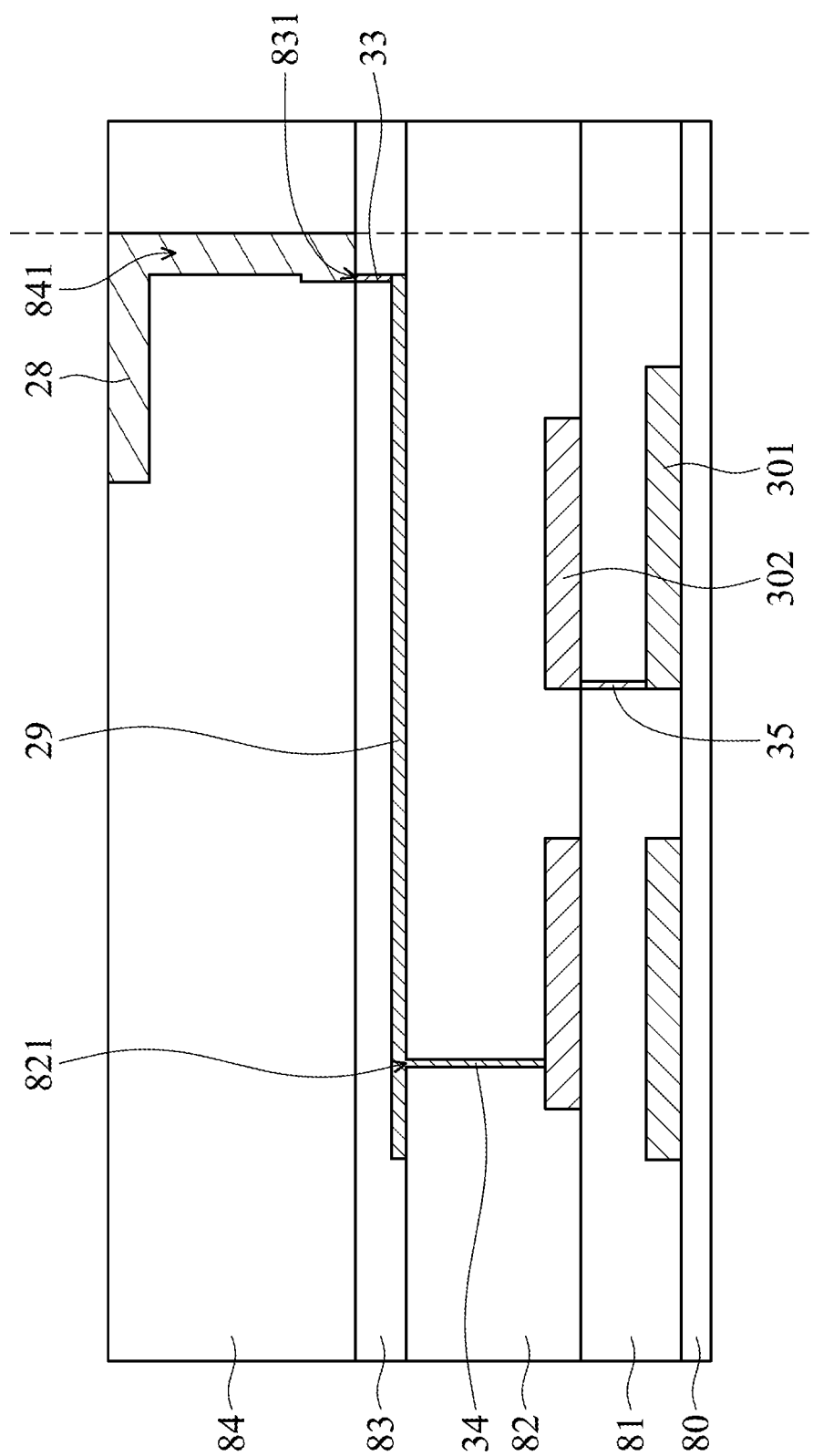
Figure 6J:
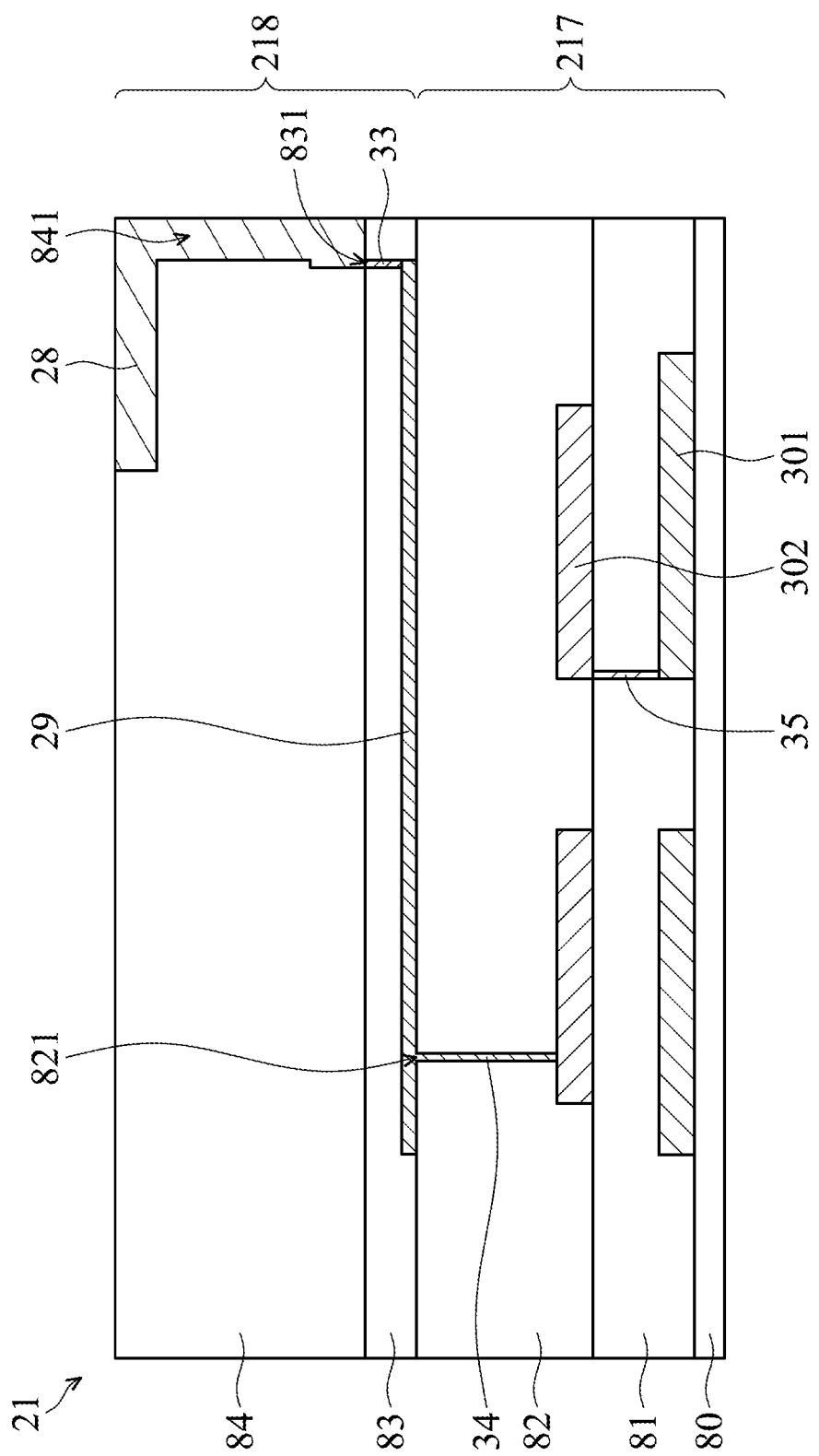

Afterwards, as shown in FIG. 6E, a via 34 is formed in the blind hole 821 and a conductive layer 29 is formed on the insulation layer 82. Afterwards, as shown in FIG. 6F, an insulation layer 83 is formed on the conductive layer 29 and a drilling process is performed to form a blind hole 831 on the insulation layer 83 to expose the conductive layer 29. Afterwards, as shown in FIG. 6G, a via 33 is formed in the blind hole 831. Afterwards, as shown in FIG. 6H, an insulation layer 84 is formed on the insulation layer 83 and a drilling process is performed to form a blind hole 841 on the insulation layer 84 to expose the via 33. Afterwards, as shown in FIG. 6I, terminals are formed on the insulation layer 82 and formed in the blind hole 841. Afterwards, a cutting process is performed along the edge of the blinding hole 841 so as to form the fixed member 21, as shown in FIG. 6J. In the fixed member 21, the coil substrate 217 includes the insulation layers 80, 81, and 82, and the lower substrate 218 includes the insulation layers 83 and 84.

In some embodiments, the external terminals 28, the conductive layer 29, the driving coils 30 and 31, the position sensors 32, and the vias 33 include but are not limited to nickel, gold, tin, lead, copper, aluminum, silver, chromium, tungsten, or alloys thereof. In addition, the insulation layers 80-84 include but are not limited to epoxy resin, bismaleimide triacine, polyimide, Ajinomoto build-up film, poly phenylene oxide, polypropylene, polymethyl methacrylate, polytetrafluorethylene. No adhesive material is used to bond the insulation layers 80-84, and no gap is formed between the insulation layers 80-84.

Figure 7:
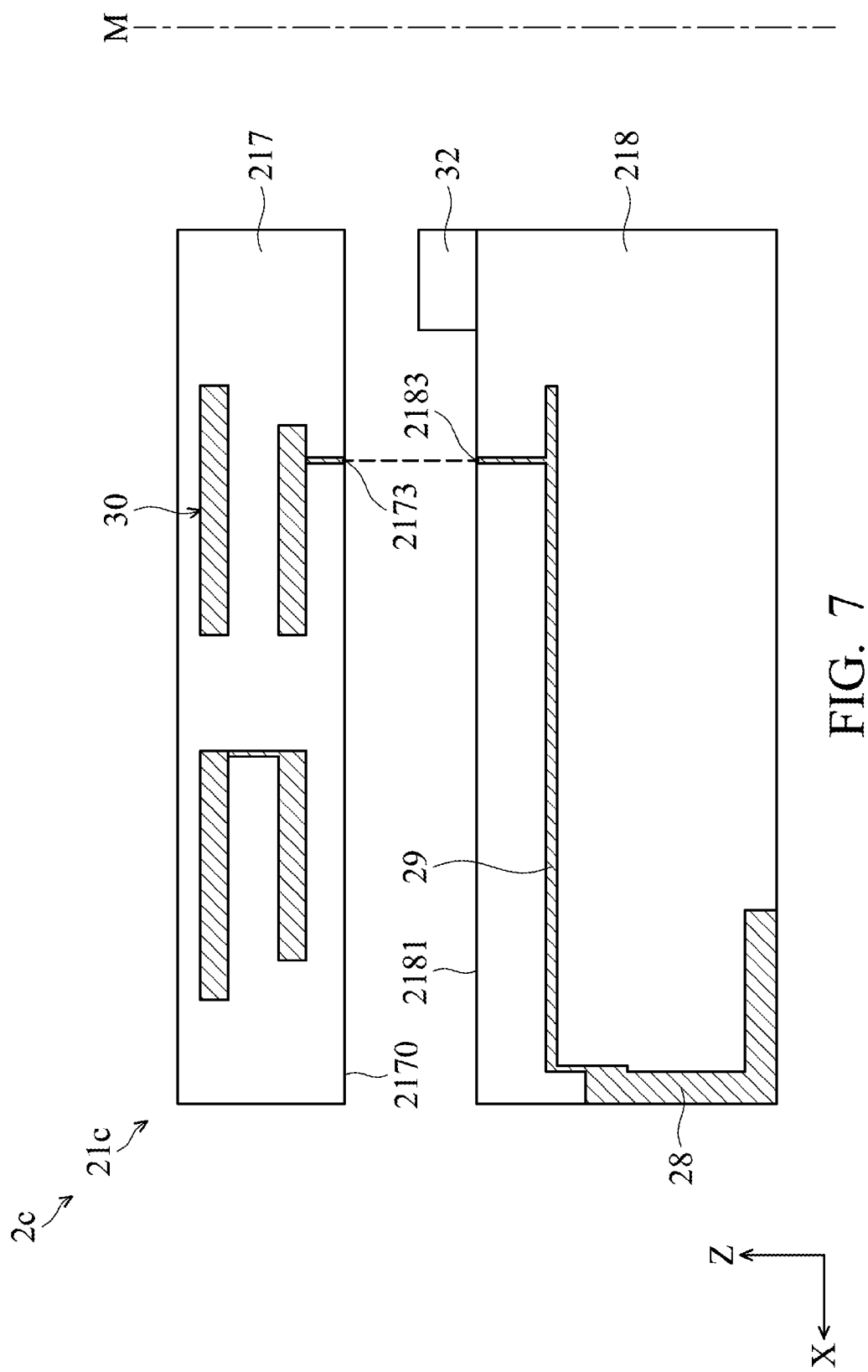
FIG. 7 shows a cross-sectional view of an electromagnetic driving module, in accordance with some embodiments of the disclosure.

FIG. 7 shows a cross-sectional view of a fixed member 21c of an electromagnetic driving module 2c, in accordance with some embodiments of the disclosure. In the embodiments of FIG. 7, elements similar to those of the embodiments of FIGS. 1-3 are provided with the same reference numbers, and the features thereof are not repeated in the interest of brevity. In some embodiments, a coil substrate 217 and a lower substrate 218 of the fixed member 21c are fabricated independently and are connected to one another by the top surface 2181 and the bottom surface 2170, wherein an electrical connection is established by the connection of electrical contacts 2173 and 2183. In addition, the position sensor 32 is positioned on the top surface 2181 and is electrically connected to the conductive layer 29.

Figure 8:
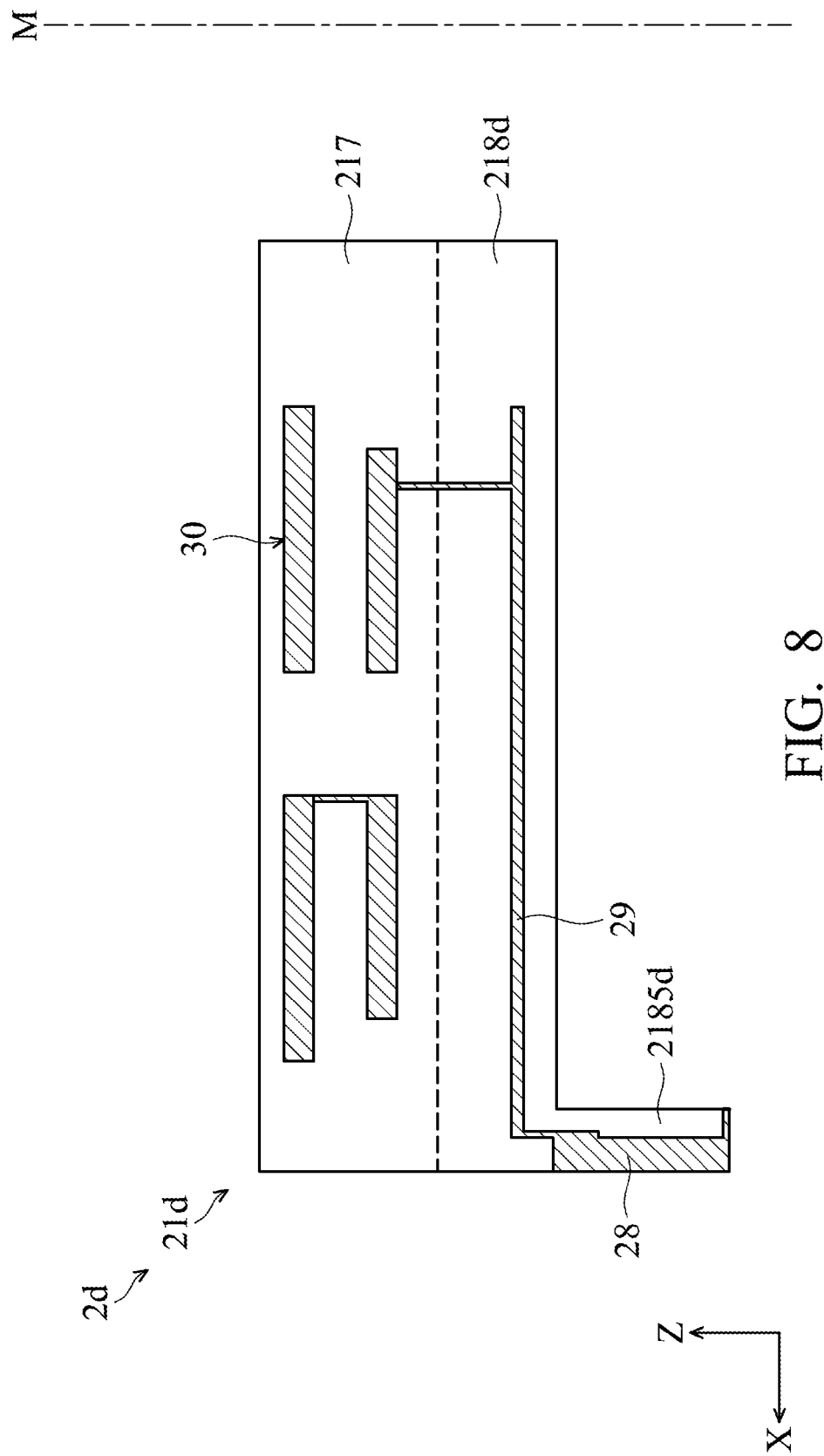
FIG. 8 shows a cross-sectional view of an electromagnetic driving module, in accordance with some embodiments of the disclosure.

FIG. 8 shows a cross-sectional view of a fixed member 21d of an electromagnetic driving module 2d, in accordance with some embodiments of the disclosure. In the embodiments of FIG. 8, elements similar to those of the embodiments of FIGS. 1-3 are provided with the same reference numbers, and the features thereof are not repeated in the interest of brevity. In some embodiments, the fixed member 21d includes a lower substrate 218d. The lower substrate 218d has an extending portion 2185d extending in a direction that is parallel to the main axis M. The external terminal 28 is exposed by a lateral surface of the extending portion 2185d away from the main axis M and is covered by a lateral surface of the extending portion 2185d near the main axis M. Since the external terminal 28 is inserted into the lower substrate 218d, the external terminal 28 is prevented from being deformed to ensure the stability of the electrical connection to the external circuit.

Compared with a conventional driving module, the electromagnetic driving module of the disclosure has fewer elements, and thus the manufacturing cost is reduced and the manufacturing process is simplified. In addition, in the disclosure, since the conductive layer, the driving coils, and the external terminals of the electromagnetic driving module are directly formed on one single fixed member, the processes to bond the neighboring elements by the use of adhesive material are omitted. Therefore, the problem of the driving coils and the driving magnets having unequal spaced distance due to unevenly applied adhesive material is prevented. As a result, in addition to having reduced thickness, the electromagnetic driving module has an improved driving force and control accuracy.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An electromagnetic driving assembly, comprising:
a movable member;
a fixed member spaced apart from the movable member, wherein the movable member and the fixed member are arranged along a main axis;
a driving magnet disposed on the movable member;
a driving coil formed in the fixed member and arranged to correspond to the driving magnet;
a conductive layer formed in the fixed member and electrically connected to the driving coil; and
a terminal exposed by the fixed member and electrically connected to conductive layer, wherein the thickness of the terminal is different from the thickness of the conductive layer, and the driving coil, the conductive layer and the terminal are embedded in the fixed member.

2. The electromagnetic driving assembly as claimed in claim 1, wherein the thickness of the terminal in a direction that is perpendicular to the main axis is greater than the thickness of the conductive layer in a direction that is parallel to the main axis.

3. The electromagnetic driving assembly as claimed in claim 1, wherein the fixed member comprises:
a coil substrate, wherein the driving coil is positioned in the coil substrate; and
a lower substrate, wherein the conductive layer is positioned in the lower substrate and arranged at a position that is near the coil substrate, and the terminal is exposed by the lower substrate.

4. The electromagnetic driving assembly as claimed in claim 1, wherein the fixed member comprises:
a coil substrate, wherein the driving coil is positioned in the coil substrate; and
a lower substrate, wherein the conductive layer is positioned in the lower substrate, and the terminal is exposed by the lower substrate, wherein a bottom surface of the coil substrate and a top surface of the lower substrate are formed integrally.

5. The electromagnetic driving assembly as claimed in claim 4, wherein the coil substrate and the lower substrate are made of the same material.

6. The electromagnetic driving assembly as claimed in claim 1, wherein the fixed member comprises a plurality of insulation layers, and the conductive layer is sandwiched between the insulation layers.

7. The electromagnetic driving assembly as claimed in claim 1, further comprising a position sensor, wherein the position sensor is disposed underneath a top surface of the fixed member, or the position sensor is flush with the top surface of the fixed member.

8. The electromagnetic driving assembly as claimed in claim 7, wherein a positioning recess is formed on the top surface of the fixed member, and the position sensor is disposed in the positioning recess.

9. The electromagnetic driving assembly as claimed in claim 1, further comprising a wire connecting the fixed member to the movable member, and a connected recess is formed on the top surface of the fixed member, wherein one end of the wire is fixed in the connected recess.

10. The electromagnetic driving assembly as claimed in claim 1, wherein a projection of the driving coil in a direction that is parallel to the main axis is located outside of the conductive layer.

11. The electromagnetic driving assembly as claimed in claim 1, wherein the fixed member comprises an extending portion extending in a direction that is parallel to the main axis, wherein the terminal is exposed by a lateral surface of the extending portion away from the main axis and is covered by a lateral surface of the extending portion near the main axis.

12. A camera device, comprising:
an electromagnetic driving assembly comprising:
a movable member;
a fixed member spaced apart from the movable member, wherein the movable member and the fixed member are arranged along a main axis;
a driving magnet disposed on the movable member;
a driving coil formed in the fixed member and arranged to correspond to the driving magnet;
a conductive layer formed in the fixed member and electrically connected to the driving coil; and
a terminal exposed by the fixed member and electrically connected to conductive layer, wherein the thickness of the terminal is different from the thickness of the conductive layer, and the driving coil, the conductive layer and the terminal are embedded in the fixed member; and
a lens assembly positioned in the movable member, wherein the optical axis of the lens assembly is aligned with the main axis.

* * * * *